(12) United States Patent
Mizutani

(10) Patent No.: US 9,136,744 B2
(45) Date of Patent: Sep. 15, 2015

(54) ELECTRIC MOTOR WITH REDUCED AXIAL FOOTPRINT

(75) Inventor: Nobuo Mizutani, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 155 days.

(21) Appl. No.: 13/335,259

(22) Filed: Dec. 22, 2011

(65) Prior Publication Data

US 2012/0161560 A1 Jun. 28, 2012

(30) Foreign Application Priority Data

Dec. 28, 2010 (JP) ................................. 2010-291608
Oct. 31, 2011 (JP) ................................. 2011-239525

(51) Int. Cl.
  *H02K 5/22* (2006.01)
  *H02K 7/116* (2006.01)
  *H01R 39/38* (2006.01)
  *H02K 5/14* (2006.01)

(52) U.S. Cl.
  CPC .............. *H02K 7/1166* (2013.01); *H02K 5/148* (2013.01); *H02K 5/225* (2013.01)

(58) Field of Classification Search
  CPC ...................................................... H02K 5/225
  USPC .................................. 310/239, 242, 71, 75 R
  IPC ........................................................ H02K 5/14
  See application file for complete search history.

(56) References Cited

U.S. PATENT DOCUMENTS

| | | | |
|---|---|---|---|
| 6,452,297 B2 * | 9/2002 | Yamamoto et al. ............. | 310/89 |
| 6,759,783 B2 * | 7/2004 | Hager et al. ................... | 310/239 |
| 6,922,003 B2 * | 7/2005 | Uchida ........................... | 310/239 |
| 6,924,578 B2 * | 8/2005 | Hama et al. .................... | 310/239 |
| 6,998,741 B2 * | 2/2006 | Breynaert et al. ........... | 310/68 B |
| 7,102,266 B2 * | 9/2006 | Coles ............................. | 310/239 |
| 7,417,352 B2 * | 8/2008 | Hirano et al. ................. | 310/239 |
| 2008/0284272 A1 * | 11/2008 | Honda et al. .................. | 310/239 |
| 2008/0298985 A1 * | 12/2008 | Gettel et al. ............... | 417/410.1 |
| 2012/0161559 A1 | 6/2012 | Mizutani | |

FOREIGN PATENT DOCUMENTS

| | | | |
|---|---|---|---|
| JP | 2001268841 A | 9/2001 | |
| JP | 2001268842 A | 9/2001 | |

(Continued)

OTHER PUBLICATIONS

Machine Translation, Yoshida et al., JP 2010183821 A, Aug. 19, 2010.*

*Primary Examiner* — Thomas Truong
(74) *Attorney, Agent, or Firm* — Faegre Baker Daniels LLP

(57) ABSTRACT

A motor includes a motor unit, a deceleration unit, and a connector unit. The motor unit outputs rotational drive force and includes a yoke housing, a commutator, a power supply brush, a conductive member, and a brush holder. The yoke housing has an open end in an axial direction. The conductive member is electrically connected to the power supply brush. The brush holder is arranged in the open end to hold the commutator, the power supply brush, and the conductive member. The deceleration unit includes a gear housing coupled to the open end. The connector unit is coupled to the gear housing and including a connection terminal electrically connected to the conductive member. The commutator and the power supply brush are arranged outside the yoke housing. The conductive member and the yoke housing are arranged on opposite sides of the commutator.

16 Claims, 9 Drawing Sheets

(56) References Cited

FOREIGN PATENT DOCUMENTS

| | | | |
|---|---|---|---|
| JP | 2003018794 A | | 1/2003 |
| JP | 2003-523708 A | | 8/2003 |
| JP | 2005057926 A | | 3/2005 |
| JP | 2008167515 A | | 7/2008 |
| JP | 2010183821 A | * | 8/2010 |
| WO | WO0161828 | | 8/2001 |

* cited by examiner

ELECTRIC MOTOR WITH REDUCED AXIAL FOOTPRINT

CROSS-REFERENCE TO RELATED APPLICATION

This application claims priority to Japanese Application No. 2010-291608, filed Dec. 28, 2010, and Japanese Application No. 2011-239525, filed Oct. 31, 2011, all of which are herein incorporated by reference in their entirety.

TECHNICAL FIELD

The present invention relates to a motor used as a drive source for a power window device or the like.

BACKGROUND

Japanese National Phase Laid-Open Patent Publication No. 2003-523708 describes a motor for a power window device. The motor includes a motor unit, a deceleration unit, and a connector unit. The motor unit includes a rotor arranged in a yoke housing. The deceleration unit is arranged at an axial end of the motor unit and decelerates rotational drive force of the motor unit. The connector unit is coupled to a gear housing. The yoke housing includes an open end from which a rotation shaft of the rotor projects toward the deceleration unit. A brush holder is arranged in the open end to hold a power supply brush, which supplies power to a commutator of the rotor. The deceleration unit includes a gear housing fixed by screws or the like to the open end. A worm gear, a worm wheel, and the like of a deceleration mechanism are accommodated in the gear housing. The deceleration mechanism decelerates and outputs the rotational drive force of the motor unit. The connector unit is connected to an external connector used to input and output electric signals and supply power. The connector unit includes a connection terminal connected to a conductive member, which is electrically connected to the power supply brush.

The commutator of the motor unit and the power supply brush are arranged outside the yoke housing in the motor of the above publication. Thus, the yoke housing can be easily manufactured at a low cost since the metal yoke housing can have a simple shape to accommodate the brush holder.

Due to the available space in the door of a vehicle, it is desirable that a motor used as a drive source for a power window device be reduced in size in a radial direction that is orthogonal to the axial direction of the motor. However, in the motor of the above publication, the conductive member (printed substrate in the above publication), which is electrically connected to the power supply brush, is arranged beside the commutator in the direction orthogonal to the axial direction. This enlarges the motor in the direction orthogonal to the axial direction.

SUMMARY

It is an object of the present invention to prevent enlargement of the motor in the radial direction when the commutator and the power supply brush are arranged outside the yoke housing.

One aspect of the present invention is a motor including a motor unit that outputs rotational drive force. The motor unit includes a yoke housing having an open end in an axial direction, a commutator, a power supply brush that supplies power to the commutator, a conductive member electrically connected to the power supply brush, and a brush holder arranged in the open end to hold the commutator, the power supply brush, and the conductive member. The motor further includes a deceleration unit and a connector unit. The deceleration unit includes a gear housing coupled to the open end. A deceleration mechanism is arranged in the gear housing to decelerate and output the rotational drive force of the motor unit. The connector unit is coupled to the gear housing and includes a connection terminal electrically connected to the conductive member. The commutator and the power supply brush are arranged outside the yoke housing. The conductive member and the yoke housing are arranged on opposite sides of the commutator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of the present invention will now be described with reference to the drawings.

Figure 1:
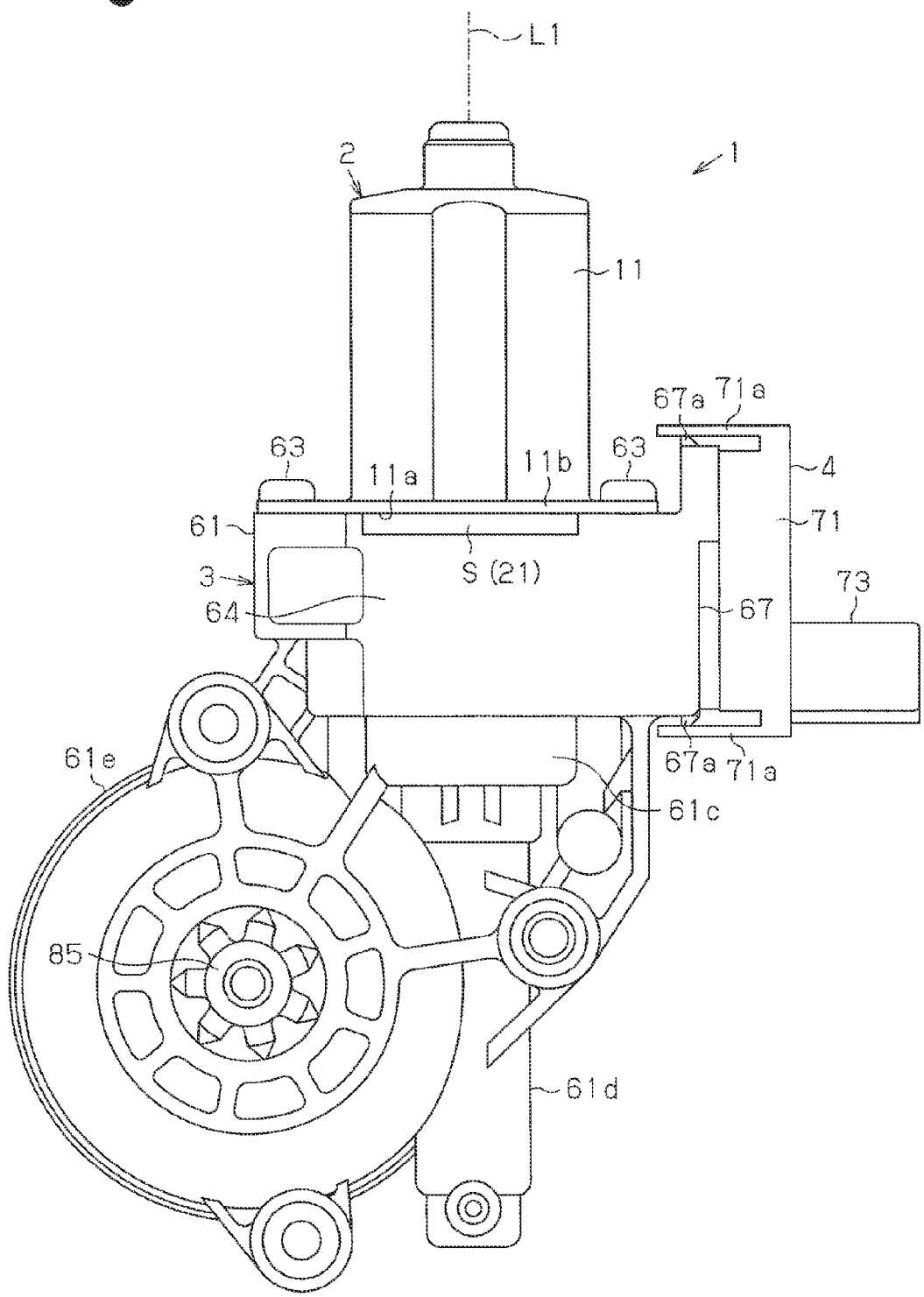
FIG. 1 is a side view showing a motor according to one embodiment of the present invention.

A motor 1 of the present embodiment shown in FIG. 1 is used as a drive source for a power window device that electrically raises and lowers a window glass for a vehicle. The motor 1 includes a motor unit 2 located at an upper section of FIG. 1, a deceleration unit 3 arranged at one end in an axial direction (end from which drive force is output, namely, the output end) of the motor unit 2, and a connector unit 4 coupled to a side (right side in FIG. 1) of the deceleration unit 3. The motor 1, as a whole, is flat in shape in a direction orthogonal to an axis L1 (direction orthogonal to plane of FIG. 1). The description hereafter will be given under the assumption that a longitudinal direction (left and right direction in FIG. 1) when viewing the motor 1 from the axial direction is a planar direction, and a short side direction (direction orthogonal to plane of FIG. 1) is a thickness direction. The axial direction, the planar direction, and the thickness direction of the motor 1 are directions that are orthogonal to one another. The axial direction, the radial direction, and the circumferential direction respectively indicate the axial direction, the radial direction, and the circumferential direction of the motor 1 (motor unit 2).

[Structure of Motor Unit]

Figure 2:
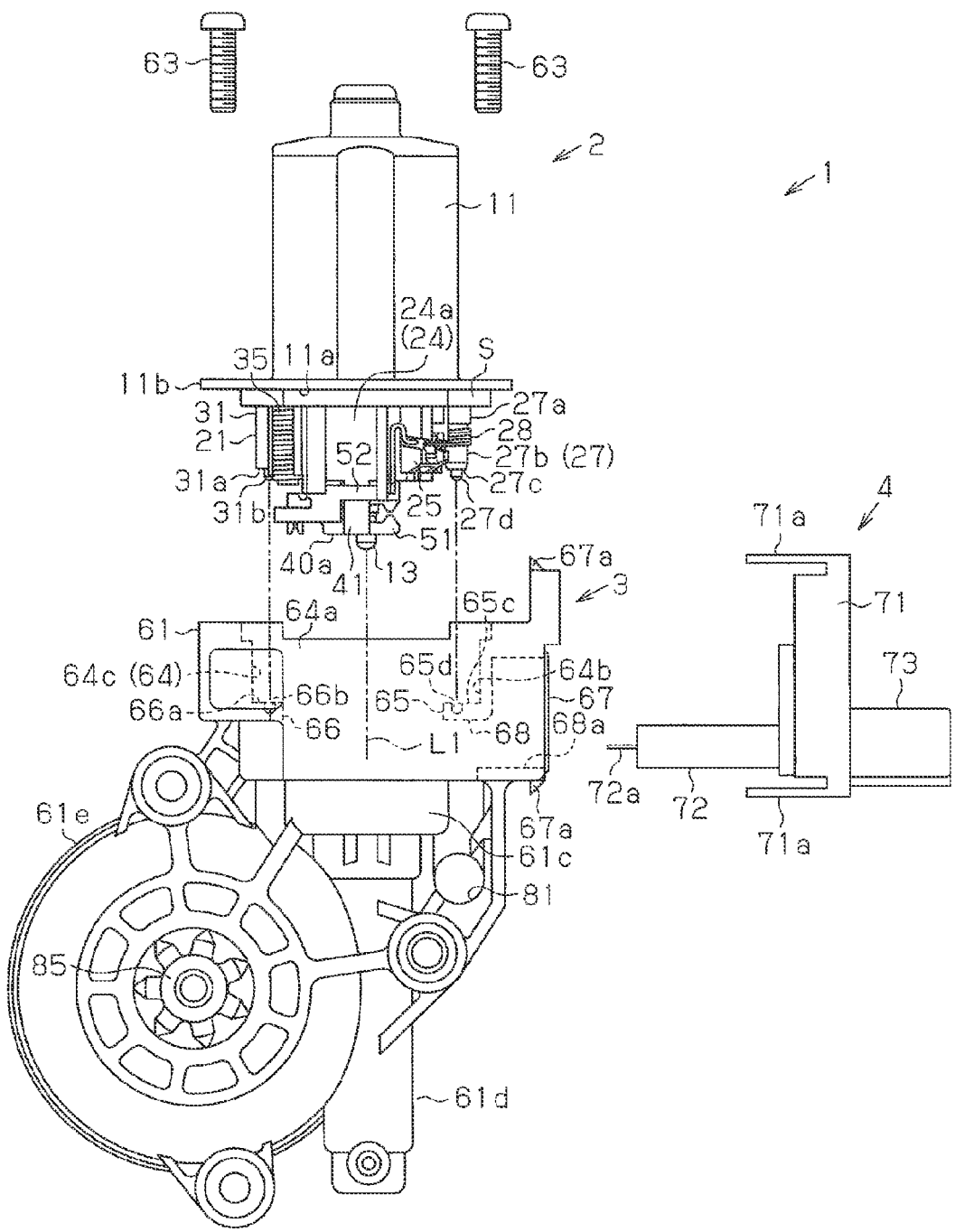
FIG. 2 is an exploded side view showing the motor of FIG. 1.
Figure 3:
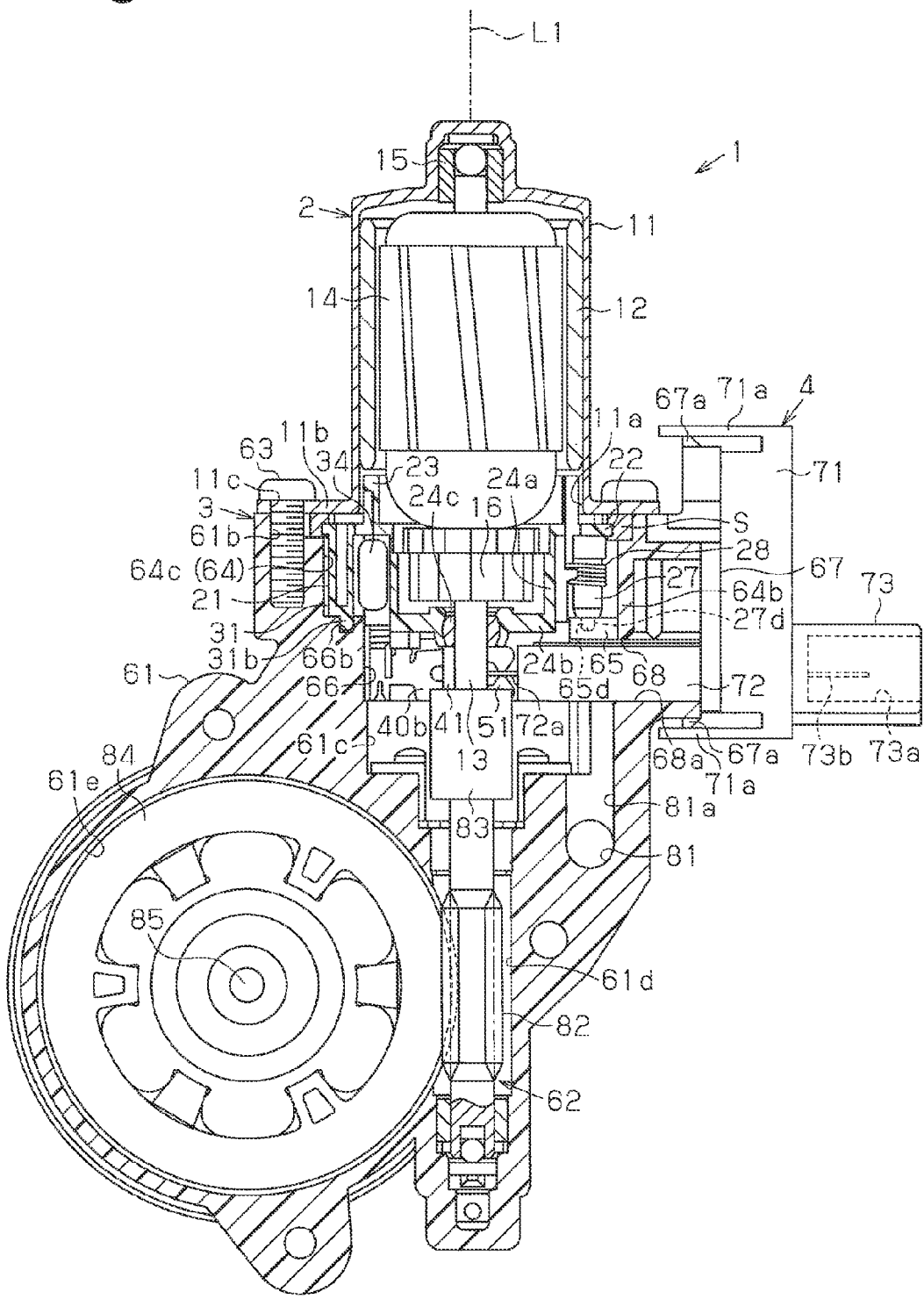
FIG. 3 is a cross-sectional view of the motor of FIG. 1.

As shown in FIGS. 1 to 3, a yoke housing 11 (hereinafter simply referred to as yoke 11) of the motor unit 2 has a first end and a second end located on opposite axial sides. The yoke 11 has a tubular shape, in which the first end (end on upper side in FIG. 1) forms a closed bottom and the second end (output end) forms an open end 11a. A flange 11b extends outward in the radial direction of the motor 1 at the open end 11a.

As shown in FIG. 3, an armature 14 including a cylindrical rotation shaft 13 is arranged at an inner side of a magnet 12, which is fixed to an inner circumferential surface of the yoke 11. The rotation shaft 13 is arranged in the yoke 11 at a central part in the radial direction. A basal end (upper end in FIG. 1) of the rotation shaft 13 is rotatably supported by a bearing 15 arranged at the bottom center of the yoke 11. The armature 14 rotates integrally with the rotation shaft 13 about the axis L1 of the rotation shaft 13. A distal end of the rotation shaft 13 projects out of the yoke 11 from the open end 11a, and a commutator 16 is fixed to the projecting portion of the rotation shaft 13. In other words, the commutator 16 is arranged outside the yoke 11. The commutator 16 and the distal end of the rotation shaft 13 are arranged in a resin gear housing 61 that forms the deceleration unit 3.

[Structure of Brush Holder]

Figure 4:
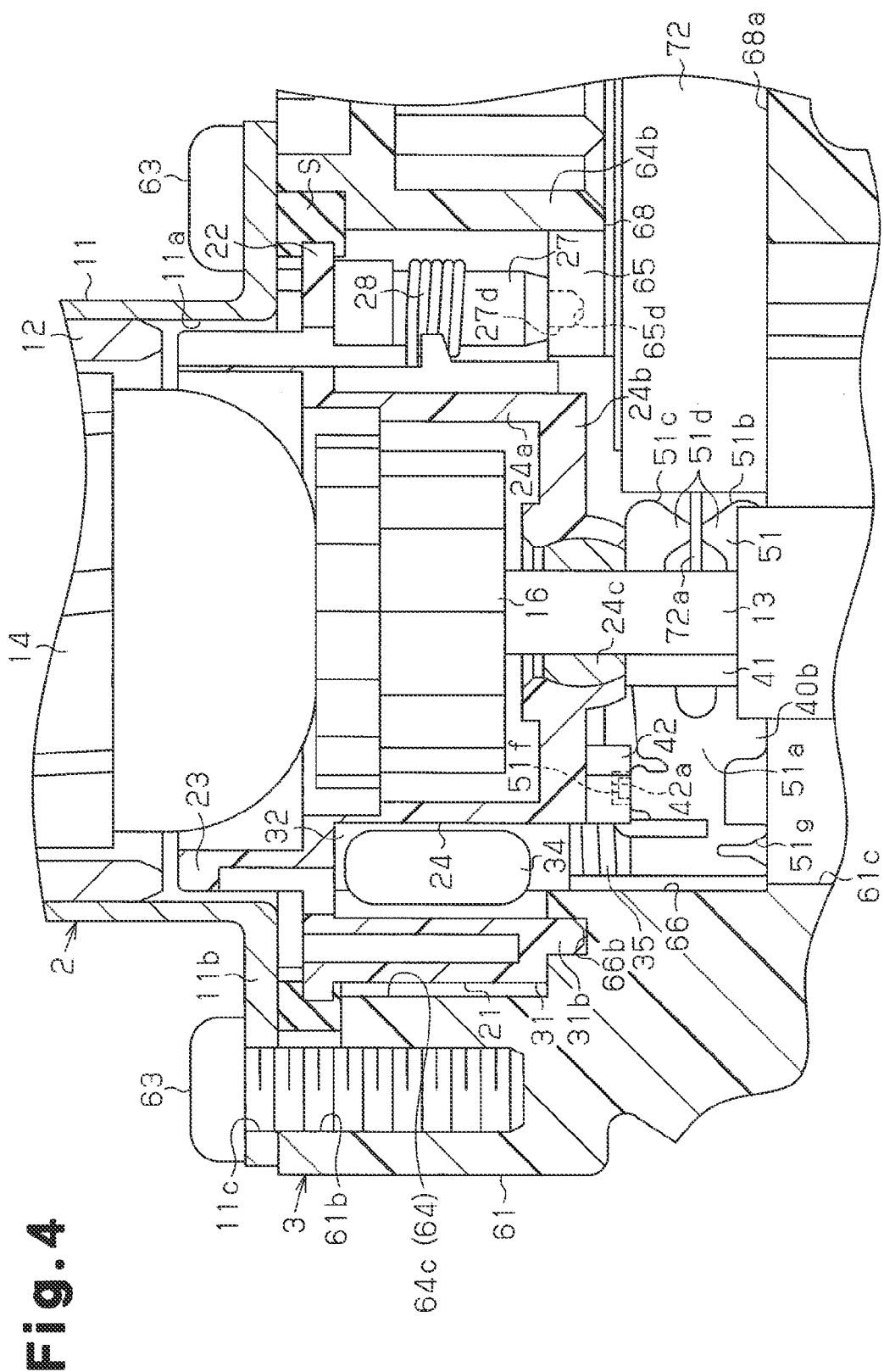
FIG. 4 is an enlarged cross-sectional view showing the vicinity of a brush holder in the motor of FIG. 3.

As shown in FIGS. 3 and 4, a brush holder 21 is arranged in the open end 11a. The brush holder 21 includes a planar basal part 22 located outside the open end 11a in the axial direction. The basal part 22 is formed so that the size in the direction orthogonal to the axial direction, that is, the radial direction, is slightly greater than the open end 11a of the yoke 11. The basal part 22 has a fixed wall portion 23 extending in the axial direction along the inner circumferential surface of the yoke 11. The fixed wall portion 23 is inserted from the open end 11a into the yoke 11 and fixed thereto. A seal member S made of elastomer is arranged at the outer edge of the basal part 22. The seal member S has a U-shaped cross-section to sandwich the outer edge of the basal part 22 in the axial direction. The seal member S is axially sandwiched by the flange 11b and the gear housing 61. The seal member S thus seals a space between the open end 11a and an opening closer to the yoke 11 of the gear housing 61. This prevents liquid from entering the yoke 11 and the gear housing 61.

Figure 5:
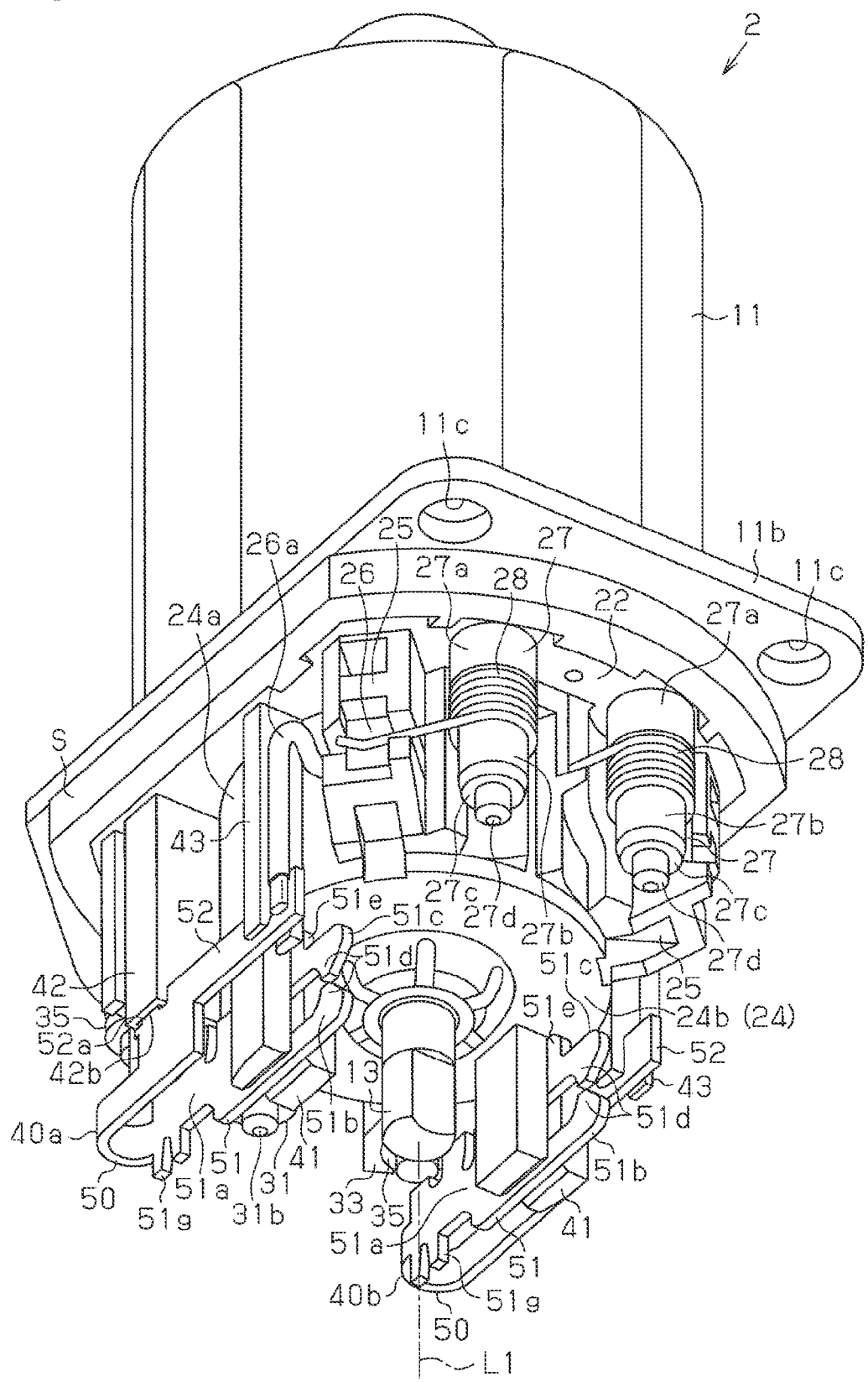
FIG. 5 is a perspective view showing a motor unit of FIG. 1.
Figure 6:
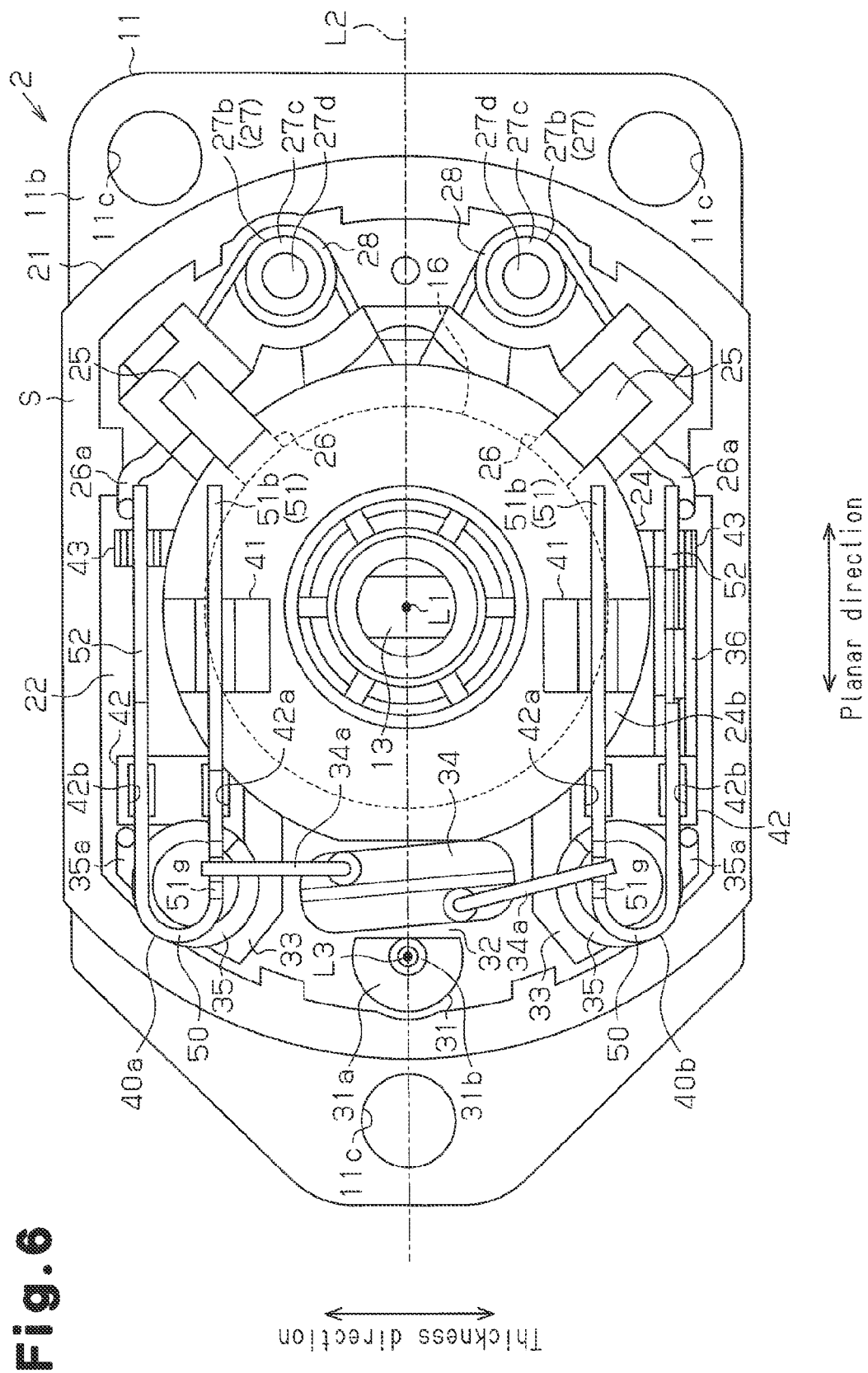
FIG. 6 is a plan view showing the motor unit of FIG. 1 from an output end.

A cover 24 is formed at the basal part 22. The cover 24 includes an outer circumferential wall portion 24a that axially extends from the lower end face (end face on the side opposite to the end face closer to the yoke 11) of the basal part 22 and substantially covers the outer periphery of the commutator 16, and a circular wall portion 24b that is formed at an axial end (lower end) of the outer circumferential wall portion 24a to cover the axial end face of the commutator 16. The circular wall portion 24b forms the end face on the side opposite to the end face of the cover 24 closer to the yoke 11 in the axial direction. A bearing 24c for rotatably supporting the rotation shaft 13 is arranged at the center of the circular wall portion 24b. As shown in FIGS. 5 and 6, two brush accommodation portions 25 extend outward in the radial direction from the outer circumferential wall portion 24a of the cover 24 and are spaced about by 90 degrees in the circumferential direction at the lower end face of the basal part 22. More specifically, as shown in FIG. 6, the brush accommodation portion 25 is arranged at positions spaced apart by 45 degrees in the circumferential direction from opposite sides of a line L2 (hereinafter referred to as planar line L2) that is orthogonal to the axis L1 of the rotation shaft 13 and lies along the planar direction of the motor 1.

As shown in FIGS. 5 and 6, each brush accommodation portion 25 is box-shaped and opens at opposite sides in the radial direction. In other words, each brush accommodation portion 25 has a hollow shape that communicates the interior and the exterior of the cover 24. The power supply brush 26, which is substantially box-shaped, is accommodated in each brush accommodation portion 25 and movable in the radial direction. The distal end (radially inner end) of the power supply brush 26 projects toward the inner circumferential side of the outer circumferential wall portion 24a of the cover 24 from the brush accommodation portion 25 and contacts the outer peripheral surface of the commutator 16 in the cover 24. The cover 24 prevents brush powder, which is produced when the power supply brush 26 slides along the commutator 16, from falling down.

Two support columns 27, which project out to the opposite side of the yoke 11 in the axial direction from the lower end face of the basal part 22, are formed between the two brush accommodation portions 25 in the circumferential direction. The brush accommodation portions 25 and the support column 27 are collectively arranged on one side in the planar direction with respect to the axis L1 of the rotation shaft 13 and are formed to be line symmetric with respect to the planar line L2.

Each support column 27 has a circular cross-section and includes a basal end defining a large diameter portion 27a. A support portion 27b axially extends from the large diameter portion 27a. A coil portion of a torsion spring 28 serving as a bias member is fitted to and held on the support portion 27b. The large diameter portion 27a has a larger diameter than the support portion 27b. In other words, the location where the support portion 27b shifts to the large diameter portion 27a forms a step that axially positions the torsion spring 28.

A distal end 27c (axial end) of the support column 27 has a planar shape and is orthogonal to the axis L1. A first positioning projection 27d (positioning portion closer to gear housing) projects in the axial direction from the center of the distal end 27c. The positioning projection 27d is cylindrical and has a smaller diameter than the support column 27. The positioning projection 27d and the support column 27 are coaxial. A step is formed between the positioning projection 27d and the support column 27.

One end of the torsion spring 28 supported by the support column 27 is held by the outer circumferential wall portion 24a of the cover 24. The other end of the torsion spring 28 is radially brought into contact with the basal end of the power supply brush 26 to push the power supply brush 26 inward in the radial direction. This biases the power supply brush 26 inward in the radial direction, and the distal end of the power supply brush 26 comes into contact under pressure with the outer peripheral surface of the commutator 16 in the cover 24.

A projecting column 31 that projects opposite to the yoke in the axial direction from the lower end face of the basal part 22 is formed at a side in the planar direction of the cover 24 or a part on the side opposite to the part where the brush accommodation portion 25 and the support column 27 are arranged. The projecting column 31 has a D-shaped cross-section in which the side surface closer to the cover 24 in the planar direction is partially cut out. The projecting column 31 is arranged next to the rotation shaft 13 in the planar direction. An axis L3 of the projecting column 31 is parallel to the axis L1 of the rotation shaft 13 and orthogonal to the planar line L2. In other words, the two support columns 27, the two brush accommodation portions 25, and the two power supply brushes 26 are line symmetric with respect to a line (planar line L2 in the present embodiment) extending through the axis L3 of the projecting column 31 and the axis L1 of the rotation shaft 13 as viewed in the axial direction.

A distal end 31a of the projecting column 31 has a planar shape and is orthogonal to the axis L1. A second positioning projection 31b (positioning portion closer to projecting column) projects in the axial direction from the center of the distal end 31a. The positioning projection 31b is cylindrical and has a smaller diameter than the projecting column 31. The positioning projection 31b and the projecting column 31 are coaxial. A step is formed between the positioning projection 31b and the projecting column 31.

A holding wall portion 33 forming part of a capacitor accommodation portion 32 is arranged upright on opposite sides of the projecting column 31 in the circumferential direction. A capacitor 34 serving as an electrical component is coupled from the side opposite to the yoke 11 in the axial direction in the capacitor accommodation portion 32, which is formed by each holding wall portion 33, the projecting column 31, and the cover 24. A choke coil 35 serving as an electrical component is held on the side opposite to the capacitor 34 of each holding wall portion 33. Each choke coil 35 is arranged so that its axis is parallel to the axis L1 of the motor unit 2. The two holding wall portions 33 and the two choke coils 35 are respectively configured to be line symmetric with respect to the planar line L2.

Two terminals 40a, 40b (conductive member) are arranged at positions on the side opposite to the yoke 11 in the axial direction with respect to the cover 24. The brush holder 21 includes first to third terminal holders 41 to 43 for each of the two terminals 40a, 40b. Each of the two first to third terminals holders 41 to 43 and the two terminals 40a, 40b are respectively configured to be line symmetric with respect to the planar line L2 of the motor 1.

The two first terminal holders 41 extend in an axial direction from a circular wall portion 24b and sandwich the rotation shaft 13 of the motor 1 in the thickness direction that. Each first terminal holder 41 is bifurcated to sandwiching the planar terminals 40a, 40b in the plate thickness direction. Each second terminal holder 42 is arranged upright at the lower end face of the basal part 22 closer to the cover 24 with respect to each choke coil 35 in the planar direction. First and second fixing recesses 42a, 42b are arranged in the thickness direction of the motor 1 at the distal end face in the axial direction of each second terminal holder 42. The fixing recess positioned on the inner side in the thickness direction of the motor 1 of the first and second fixing recesses 42a, 42b is the first fixing recess 42a and that on the outer side is the second fixing recess 42b. Each third terminal holder 43 is arranged at positions adjacent in the circumferential direction with each of the two brush accommodation portions 25, the position being on the side opposite to the support column 27. The third terminal holder 43 is formed extending in the axial direction from the lower end face of the basal part 22. The distal end in the axial direction of the third terminal holder 43 is bifurcated to sandwich the planar terminals 40a, 40b in the plate thickness direction in the same manner as the first terminal holder 41.

Each terminal 40a, 40b is formed by pressing and punching a conductive metal plate material to a predetermined shape and then bending a plurality of locations. Each terminal 40a, 40b is U-shaped as viewed in the axial direction and arranged so that the distal end of the U-shape is directed in the planar direction of the motor 1. The terminals 40a, 40b are respectively arranged on opposite sides of the rotation shaft 13 in the thickness direction of the motor 1. In other words, the rotation shaft 13 is inserted between the terminals 40a, 40b arranged parallel to the thickness direction. The terminals 40a, 40b are arranged so that their planar surfaces are parallel to the axis L1 of the rotation shaft 13. The first to third terminal holders 41 to 43 are each configured so that the terminals 40a, 40b are coupled from the opposite side of the yoke 11 with respect to the first to third terminal holders 41 to 43 in the axial direction.

Each of the terminals 40a, 40b includes a bent portion 50, which serves as an intermediate portion, a first terminal portion 51, and a second terminal portion 52, and is configured to be U-shaped when viewed in the axial direction. The bent portion 50 is positioned on the side opposite to the yoke 11 in the axial direction with respect to the choke coil 35. The first terminal portion 51 and the second terminal portion 52 are configured so that the first and second terminal portions 51, 52 linearly extending in the planar direction from the bent portion 50 in the axial direction are arranged parallel to the thickness direction (direction orthogonal to the axis) of the motor 1 and are faced in the same direction (planar direction or direction opposing the inserting direction of a connection terminal 72a, which will be described later). The first terminal portion 51 axially overlaps the circular wall portion 24b and the commutator 16, and the second terminal portion 52 is arranged at a position that does not axially overlap the cover 24.

The first terminal portion 51 has the shape of a tuning fork, which is bifurcated into two in the axial direction, and has opens toward the planar direction when viewed from the thickness direction of the motor 1. Specifically, the first terminal portion 51 is bifurcated and includes first and second extending portions 51b, 51c extending from a basal end 51a in the planar direction (direction opposing the inserting direction of the connection terminal 72a). The first and second extending portions 51b, 51c are arranged in the axial direction. Contacting projections 51d project toward each other from distal ends of each extending portion 51b, 51c.

The first and second extending portions 51b, 51c are sandwiched in the thickness direction of the motor 1 by the first terminal holder 41. In other words, the first terminal holder 41 holds the part of the bifurcated section closer to the distal end than the basal end 51a, which is divided into two at the bifurcated section. The second extending portion 51c, which is closer to the yoke 11 of the two extending portions 51b, 51c, includes a hooking projection (hook) 51e that projects towards the cover 24 in the axial direction. The hooking projection 51e can be brought into contact with respect to the first terminal holder 41 in the planar direction (inserting direction of the connection terminal 72a) of the motor 1.

A projection 51f that projects towards the cover 24 in the axial direction is formed at a part corresponding to the second terminal holder 42 in the first terminal portion 51 (see FIG. 4). The first terminal portion 51 is held by the second terminal holder 42 when the projection 51f is fitted to the first fixing recess 42a of the second terminal holder 42. A similar projection 52a is also formed on the second terminal portion 52 (see FIG. 5). The second terminal portion 52 is held by the second terminal holder 42 when the projection 52a is fitted to the second fixing recess 42b of the second terminal holder 42. Movement in the planar direction of the terminals 40a, 40b is restricted by the fitting of the projection 51f to the first fixing recess 42a and the fitting of the projection 52a to the second fixing recess 42b. The second terminal portion 52 is sandwiched in the thickness direction of the motor 1 by the distal end in the axial direction of the third terminal holder 43.

In this manner, in each terminal 40a, 40b held at the brush holder 21, a pigtail 26a serving as a conductive wire extending from the nearest power supply brush 26 is welded to the end in the planar direction of the motor 1 in the second terminal portion 52. This electrically connects the second terminal portion 52 to the power supply brush 26 through the pigtail 26a.

Each of two connection ends 34a extending from the capacitor 34 is welded and electrically connected to a connecting portion 51g formed at the basal end 51a (boundary portion of first terminal portion 51 and bent portion 50) of the first terminal portion 51 of the terminal 40a, 40b. The connection end 35a of each choke coil 35 is welded and electrically connected to the second terminal portion 52 of the nearest terminal 40a, 40b. A thermistor 36 arranged outside the second terminal portion 52 in the thickness direction is electrically connected to the second terminal portion 52 of one terminal 40b (terminal on lower side in FIG. 6).

[Structure of Deceleration Unit]

As shown in FIG. 3, the deceleration unit 3 includes the gear housing 61 and a deceleration mechanism 62 accommodated in the gear housing 61.

Figure 7:
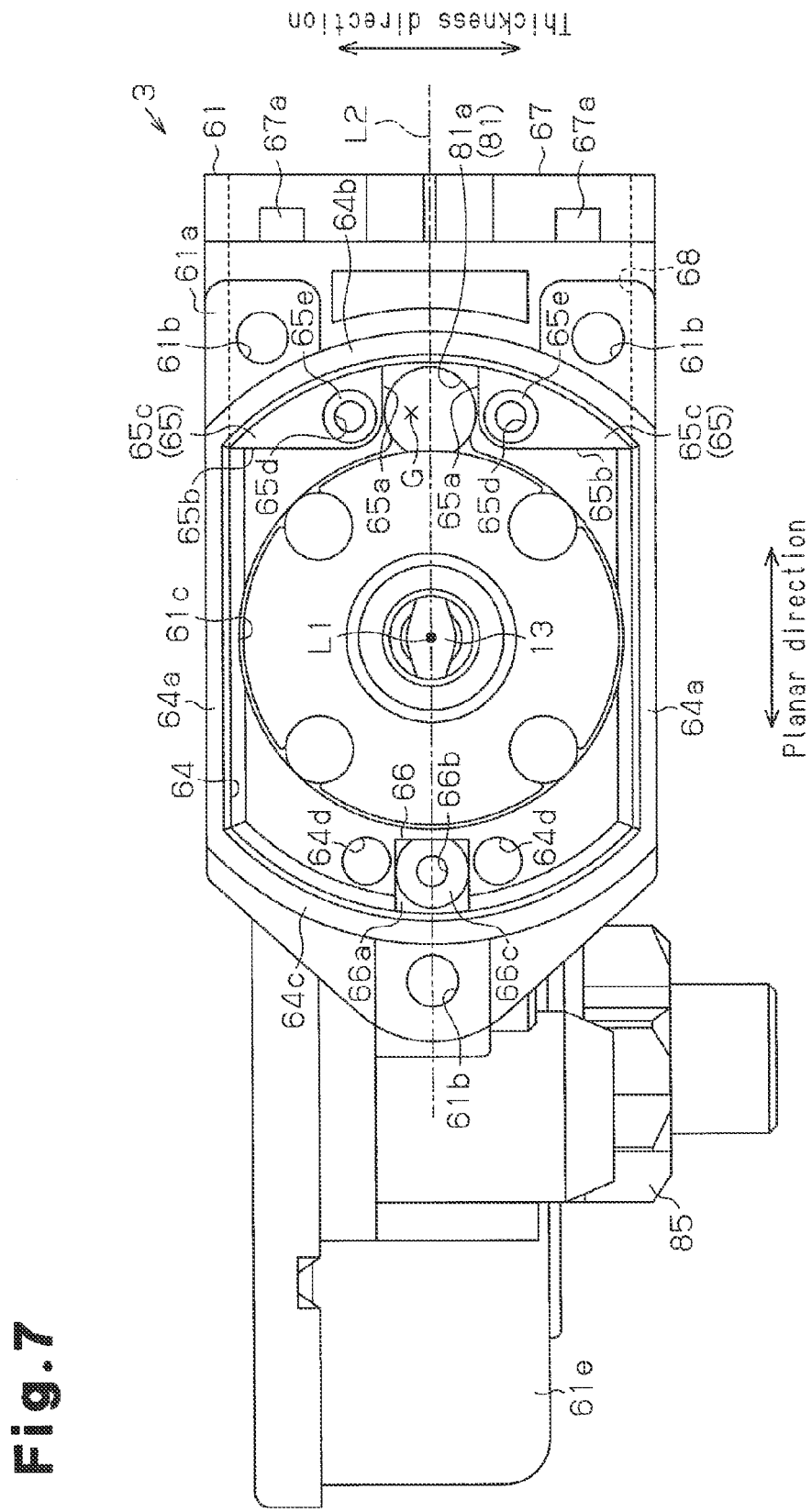
FIG. 7 is a plan view showing a gear housing of FIG. 1 from the axial direction.

As shown in FIG. 7, three threaded holes 61b are formed in an end face 61a closer to the yoke 11 of the gear housing 61. The end face 61a is brought into contact with the flange 11b of the yoke 11 in the axial direction and is fixed to the flange 11b by three screws 63 (only two are shown in FIGS. 1 to 4). The three screws 63 are fastened to the threaded holes 61b through corresponding screw insertion holes 11c (see FIG. 6) formed in the flange 11b.

A holder accommodation portion 64 open towards the yoke 11 in the axial direction is formed inward in the radial direction from the three threaded holes 61b at the end face 61a closer to the yoke 11 of the gear housing 61. The commutator 16, the rotation shaft 13, and part of the brush holder 21 of the motor unit 2 are arranged in the holder accommodation portion 64.

The holder accommodation portion 64 includes two opposing wall portions 64a, which face each other in the thickness direction of the motor 1, and two opposing wall portions 64b, 64c, which face each other in the planar direction of the motor 1. As viewed in the axial direction, each opposing wall portion 64a has a linear shape in the planar direction, and each opposing wall portion 64b, 64c has a curved shape bulging outward in the radial direction.

As shown in FIGS. 2, 3, and 7, one of the opposing wall portions (opposing wall portion 64b closer to connector unit 4) in the planar direction includes two projecting wall portions 65 positioned at the inner side of the holder accommodation portion 64 and projected outward in a direction orthogonal to the axial direction. Each projecting wall portion 65 is formed to be line symmetric with respect to the planar line L2. Each projecting wall portion 65 has a first end face 65a, which has a planar shape orthogonal to the thickness direction of the motor 1, and a second end face 65b, which is orthogonal to the first end face 65a. An end face (axial end face 65c) of each projecting wall portion 65 closer to the yoke 11 in the axial direction has a planar shape orthogonal to the axis L1. The axial end faces 65c of the two projecting wall portions 65 are positioned on the same plane.

The first end faces 65a of the two projecting wall portions 65 face each other in the thickness direction. A circular first positioning recess 65d is arranged in a recessed manner at the axial end face 65c of the two projecting wall portions 65. The two first positioning projections 27d of the brush holder 21 are fitted into the positioning recesses 65d. A projection 66 projecting inward in the radial direction from the central part in the thickness direction of the opposing wall portion 64c on the side opposite to the opposing wall portion 64b where the projecting wall portion 65 is arranged. The end face 66a closer to the yoke 11 of the projection 66 in the axial direction is positioned on the same plane as the axial end face 65c of the projecting wall portion 65. A circular second positioning recess 66b is arranged in a recessed manner at the end face 66a. The second positioning projection 31b of the brush holder 21 is fitted into such positioning recess 66b. As described above, the brush holder 21 and the gear housing 61 are positioned in the direction orthogonal to the axial direction when the first positioning projection 27d and the second positioning projection 31b of the brush holder 21 are fitted to the first positioning recess 65d and the second positioning recess 66b of the gear housing 61.

As shown in FIG. 7, the axial end face 65c of each projecting wall portion 65 includes a reference surface 65e formed by raising the circumferential part of the first positioning recess 65d. The axial end face 66a of the projection 66 is also formed with a reference surface 66c formed by raising the circumferential part of the second positioning recess 66b. Each reference surface 65e, 66c has a planar shape and is positioned on the same plane orthogonal to the axis L1 of the rotation shaft 13. The reference surface 65e is axially brought into contact with the distal end 27c of the corresponding support column 27 and the reference surface 66c is axially brought into contact with the distal end 31a of the projecting column 31, so that the brush holder 21 is positioned in the axial direction. The projecting amount of each reference surface 65e, 66c in the axial direction is very small and thus not shown in FIGS. 2 and 3. Each reference surface 65e, 66c is locally formed. This facilitates examination of the axial position and the planarity of each reference surface 65e, 66c and the adjustment for arranging the reference surfaces 65e, 66c on the same plane.

As shown in FIGS. 2, 3, and 7, a connector attachment portion 67 is formed on a side surface (right side in FIGS. 2, 3, and 7) of the gear housing 61 on the side opposite to the side surface closer to a wheel accommodating portion 61e in the planar direction. The connector unit 4 is coupled, in a removable manner, to the connector attachment portion 67 from the planar direction. The connector attachment portion 67 includes a socket 68 that opens towards the direction opposite to the direction towards the wheel accommodating portion 61e in the planar direction. The wall portion closer to the motor unit 2 of the socket 68 is configured by the projecting wall portion 65. The socket 68 is in communication with the holder accommodation portion 64 inside the gear housing 61. In other words, the holder accommodation portion 64 is in communication with the exterior of the gear housing 61 through the socket 68. The socket 68 has a square shape when viewed from the open direction.

As shown in FIGS. 2 and 3, the connector unit 4 includes a fixed portion 71 fixed to the connector attachment portion 67, a control IC 72 inserted into the socket 68, and an external connecting portion 73 to which an external connector (not shown) for inputting and outputting electric signals and power supply is connected. The fixed portion 71 is fixed to the connector attachment portion 67 by engaging two hooking pieces 71a to hooking projection 67a formed at opposite ends in the axial direction of the connector attachment portion 67. The space between the connector attachment portion 67 and the fixed portion 71 of the connector unit 4 is sealed to prevent liquid from entering.

The box-shaped control IC 72 having a solid rectangular shape is arranged at the fixed portion 71 to extend in the planar direction of the motor 1. A flat connection terminal 72a is arranged at the distal end (end in planar direction) of the control IC 72 to project in the planar direction of the motor 1. Two connection terminals 72a are arranged in the thickness direction of the motor 1 (only one shown in FIGS. 2 to 4). The control IC 72 is inserted in the planar direction to the socket 68 of the connector attachment portion 67. The two connection terminals 72a of the control IC 72 are respectively press-fitted between the first and second extending portions 51b, 51c of the two terminals 40a, 40b inside the holder accommodation portion 64. The inserting direction of the connection terminal 72a between the first and second extending portions 51b, 51c coincides with the coupling direction of the connector unit 4 and the gear housing 61. Each connection terminal 72a is thus elastically sandwiched by the first and second extending portions 51b, 51c in the axial direction and electrically connected to the terminals 40a, 40b. Further, an opening 73a (see FIG. 3) is formed in the external connecting portion 73 of the connector unit 4, and an exterior side connection terminal 73b electrically connected to the control IC 72 is arranged in the opening 73a. The exterior side connection terminal 73b is electrically connected to the external connector attached to the external connecting portion 73.

A circulation hole 81 is formed in the gear housing 61. An interior side opening 81a shown in FIG. 7 is formed in a wall portion 68a positioned on the opposite side in the axial direction from the wall portion facing the motor unit 2 of the wall portions defining the socket 68. The circulation hole 81 is in communication with the interior side opening 81a and is open to the exterior. The interior side opening 81a is formed at a position axially overlapping a gap G between the projecting wall portions 65 arranged in the thickness direction of the motor 1. This suppresses enlargement of the gear housing 61 in the radial direction while enabling a slide mold (not shown) for molding the interior side opening 81a to be axially removed from the gap G when molding the gear housing 61.

The circulation hole 81 prevents force from locally concentrating at a seal portion (e.g. seal member S), which seals the gear housing 61, so that a pressure difference is not produced between the outer side and inner side of the gear housing 61. The circulation hole 81 includes a waterproof sheet (not shown) that prevents water from entering the gear housing 61 while circulating air between the interior and exterior of the gear housing 61. The holder accommodation portion 64 and the wheel accommodating portion 61e, which will be described later, are respectively formed on opposite sides of the projection 66 in the circumferential direction and are in communication with a communication hole 64d, which extends in the axial direction.

The holder accommodation portion 64 communicates a clutch accommodating portion 61c, which is located at a lower side (opposite side of yoke 11) of the holder accommodation portion 64 in the axial direction, with a worm accommodating portion 61d, which is located at a further lower side of the clutch accommodating portion 61c in the axial direction. A worm shaft 82 is supported by the worm accommodating portion 61d rotatably about the axis L1. The worm shaft 82 and the rotation shaft 13 are coupled by a clutch 83 accommodated in the clutch accommodating portion 61c. The clutch 83 transmits the rotational force of the rotation shaft 13 to the worm shaft 82 and functions to generate a braking force that restricts rotation when the rotational force from the worm shaft 82 is input. The clutch 83 is configured so that the coupling portion between the clutch 83 and the rotation shaft 13 is located between the terminals 40a, 40b in the brush holder 21. This suppresses enlargement of the motor 1 in the axial direction.

The wheel accommodating portion 61e is in communication with the worm accommodating portion 61d and accommodates a circular plate-shaped worm wheel 84, which is engaged with the worm shaft 82, next to the worm accommodating portion 61d in the direction orthogonal to the axial direction. The worm wheel 84 is supported by the worm accommodating portion 61d rotatably about an axis parallel to the thickness direction of the motor 1. The worm shaft 82 and the worm wheel 84 configure the deceleration mechanism 62. The rotational force of the rotation shaft 13 is decelerated by the worm shaft 82 and the worm wheel 84 and output from the output shaft 85 shown in FIG. 1 that integrally rotates with the worm wheel 84. The output shaft 85 projects out of the gear housing 61 and is coupled to a window glass of a vehicle coupled by a window regulator (not shown).

The operation of the embodiment described above will now be described.

The power supplied from the external connector attached to the connector unit 4 is supplied from the connection terminal 72a of the control IC 72 to the commutator 16 of the armature 14 through the terminals 40a, 40b and the power supply brushes 26. The armature 14 (rotation shaft 13) is then rotated and driven. The rotational drive force of the rotation shaft 13 is transmitted to the worm shaft 82 by the clutch 83, decelerated by the worm shaft 82 and the worm wheel 84, and output from the output shaft 85. The window glass is then lowered or raised by the window regulator coupled to the output shaft 85 in accordance with the rotating direction of the output shaft 85.

In this structure, the terminals 40a, 40b are held by the brush holder 21 so that the terminals 40a, 40b and the yoke 11 are arranged at opposite sides of the commutator 16. Further, at least parts of the terminals 40a, 40b axially overlap the commutator 16. This suppresses enlargement of the motor 1 in the radial direction. Each of the terminals 40a, 40b includes the first and second terminal portions 51, 52 extending parallel to the direction (flat direction) orthogonal to the axial direction and facing the same direction. The bent portion 50 connects the first and second terminal portions 51, 52 and is substantially U-shaped. The connection terminal 72a of the connector unit 4 and the power supply brush 26 are arranged in the vicinity of the first terminal portion 51 and second terminal portion 52 of each of the terminals 40a, 40b. Various types of electric components (capacitor 34 and choke coil 35) connected to the terminals 40a, 40b are arranged in the vicinity portions connected to the terminals 40a, 40b (e.g., connecting portion 51g). Since the members connected to each other are arranged near each other, the members can be easily connected. Further, enlargement of the motor 1 in the radial direction is suppressed since each of the power supply brush 26, the capacitor 34, the choke coil 35, and the connection terminal 72a of the connector unit 4 do not need to be arranged parallel to the direction orthogonal to the axial direction.

In the motor 1 described above, the first positioning projection 27d of each support column 27 and the second positioning projection 31b of the projecting column 31 are respectively fitted to the first positioning recess 65d of each projecting wall portion 65 and the second positioning recess 66b of the projection 66 of the gear housing 61 when coupling the motor unit 2 to the gear housing 61. This positions the brush holder 21 and the gear housing 61 in the direction orthogonal to the axial direction. The projecting wall portion 65 also functions to receive brush powder dropped from the vicinity of the brush holder 21.

The distal end 27c and the distal end 31a are respectively brought into contact in the axial direction with the axial end face 65c (specifically, reference surface 65e) and the axial end face 66a (specifically, reference surface 66c). This positions the brush holder 21 in the axial direction and restricts movement of the brush holder 21 in the axial direction thereby stably supporting the brush holder 21.

The first positioning projection 27*d* is arranged at the distal end 27*c* of the support column 27. Thus, the brush holder 21 does not need to be enlarged in the direction orthogonal to the axial direction to provide space for the positioning projection 27*d*. This prevents enlargement in the radial direction while arranging the positioning projection 27*d* in the brush holder 21.

The control IC 72 of the connector unit 4 is inserted into the socket 68 of the gear housing 61. The first positioning recess 65*d* is formed on the axial end face 65*c* on the side opposite to the end face closer to the control IC 72 in the projecting wall portion 65 configuring the socket 68. Thus, the brush holder 21 and the gear housing 61 are positioned in the direction orthogonal to the axial direction at the part of the gear housing 61 closer to the motor unit 2 than the control IC 72 inserted to the socket 68. This prevents interference between the first positioning projection 27*d*, which is closer to the brush holder 21, and the control IC 72.

The present embodiment has the advantages described below.

(1) In the present embodiment, the yoke housing has an open end at one end in the axial direction. The brush holder 21 is arranged in the open end. The commutator 16 and the power supply brush 26 are arranged outside the yoke 11. The terminals 40*a*, 40*b* and the yoke 11 are arranged at opposite sides of the commutator 16. This suppresses enlargement of the motor 1 in the radial direction. The terminals 40*a*, 40*b* at least partially overlap the commutator 16 in the axial direction and suppress enlargement of the motor 1 in the radial direction.

(2) In the present embodiment, the brush holder 21 includes first to third terminal holders 41 to 43 for holding the terminals 40*a*, 40*b*. The first to third terminal holders 41 to 43 are configured so that the terminals 40*a*, 40*b* are coupled from the opposite side of the yoke 11 with respect to the first to third terminal holders 41 to 43 in the axial direction. The terminals 40*a*, 40*b* are thus coupled to the brush holder 21 from the opposite side of the yoke 11 in the axial direction. This improves the assembling efficiency of the motor 1 in which the commutator 16 and the power supply brush 26 are arranged outside the yoke 11.

(3) In the present embodiment, the commutator 16 includes a first end face facing the yoke 11 and an opposite second end face. The brush holder 21 includes the cover 24 for covering the second end face of the commutator 16. Since the cover 24 covers the end face on the side opposite to the end face facing the yoke 11 in the axial direction, brush powder is not scattered when the power supply brush 26 slides along the commutator 16. Further, the two first terminal holders 41 for holding the terminals 40*a*, 40*b* are arranged in the cover 24. This easily arranges the terminals 40*a*, 40*b* to sandwich opposite sides of the yoke 11 with respect the commutator 16 in a state at least partially overlapping the commutator 16 in the axial direction.

(4) In the present embodiment, the terminals 40*a*, 40*b* include a first terminal portion 51 having the elastic bifurcated section. The connection terminal 72*a* of the connector unit 4 is inserted into the bifurcated section of the first terminal portion 51 (between the first and second extending portions 51*b*, 51*c*) to be elastically sandwiched by the bifurcated section. Thus, the connection terminal 72*a* of the connector unit 4 and the terminals 40*a*, 40*b* are easily connected without the need for welding or the like.

(5) In the present embodiment, the bifurcated section includes the basal end 51*a* that is divided into two. The brush holder 21 includes the first terminal holder 41 that holds the part of the bifurcated section closer to the distal end than the basal end 51*a*. This holds the bifurcated section of the first terminal portion 51 sandwiching the connection terminal 72*a* in position and suppresses vibration of the bifurcated section (first and second extending portions 51*b*, 51*c*) of the first terminal portion 51. As a result, the connection stability of the terminal 40*a*, 40*b* and the connection terminal 72*a* is improved.

(6) In the present embodiment, the connector unit is coupled to the gear housing along the predetermined coupling direction. The terminals 40*a*, 40*b* include the hooking projection 51*e* that is contactable with the brush holder 21 in the coupling direction. The hooking projection 51*e* restricts movement of the terminal 40*a*, 40*b* in the connecting direction of the connection terminal 72*a*. Thus, when the connection terminal 72*a* is connected to the terminal 40*a*, 40*b*, the movement of the terminal 40*a*, 40*b* in the connecting direction is suppressed. As a result, connection of the terminal 40*a*, 40*b* and the connection terminal 72*a* is ensured.

(7) In the present embodiment, the terminals 40*a*, 40*b* are planar and have a planar surface parallel to the axis L1 of the motor unit 2. Thus, the terminals 40*a*, 40*b* are reduced in size in the direction orthogonal to the axial direction. As a result, enlargement of the motor 1 in the radial direction is prevented in a preferable manner.

(8) In the present embodiment, each of the terminals 40*a*, 40*b* held by the brush holder 21 is substantially U-shaped and includes the first and second terminal portions 51, 52, which extend parallel to the direction (flat direction) orthogonal to the axial direction and face the same direction, and the bent portion 50 connecting the first and second terminal portions 51, 52. The connection terminal 72*a* of the connector unit 4 is connected to the first terminal portion 51, and the pigtail 26*a* extending from the power supply brush 26 is connected to the second terminal portion 52. Thus, the connection terminal 72*a* of the connector unit 4 and the power supply brush 26 may be respectively arranged in the vicinity of the first terminal portion 51 and the second terminal portion 52 of each terminal 40*a*, 40*b*. Further, various types of electric components (capacitor 34 and choke coil 35) connected to the terminals 40*a*, 40*b* may be arranged in the vicinity of portions connected to the terminals 40*a*, 40*b* (e.g., connecting portion 51*g*). The members are easily connected by arranging the members close to each other. Further, the enlargement of the motor 1 in the radial direction is suppressed since each of the power supply brush 26, the capacitor 34, the choke coil 35, and the connection terminal 72*a* of the connector unit 4 do not need to be arranged in the direction parallel to the direction orthogonal to the axial direction.

(9) In the present embodiment, the first and second terminal portions 51, 52 of the terminal 40*a*, 40*b* are arranged parallel to the direction orthogonal to the axial direction of the motor unit 2. Thus, the terminals 40*a*, 40*b* are substantially U-shaped when viewed from the axial direction. This suppresses enlargement of the motor 1 in the radial direction in a preferable manner while facilitating connection of the power supply brush 26, the capacitor 34, the choke coil 35, and the connection terminal 72*a* to the terminals 40*a*, 40*b*.

It should be apparent to those skilled in the art that the present invention may be embodied in many other specific forms without departing from the spirit or scope of the invention. Particularly, it should be understood that the present invention may be embodied in the following forms.

In the embodiment described above, the terminals 40*a*, 40*b* are substantially U-shaped as viewed from the axial direction but may be, for example, substantially U-shape as viewed from a direction orthogonal to the axial direction. In other words, the terminals 40*a*, 40*b* may be configured so that the first and second terminal portions 51, 52 are arranged parallel to the axial direction of the motor unit 2. The terminals 40a, 40b may be linear when viewed from the axial direction.

In the embodiment described above, the first terminal portion 51 has the shape of a tuning fork in each of the terminals 40a, 40b but is not particularly limited in such a manner. The shape of the first terminal portion 51 and the structure connecting the connection terminal 72a may be changed in accordance with the specification.

In the embodiment described above, the terminals 40a, 40b are arranged so that the planar surface is parallel to the axis L1 of the motor unit 2 but may be arranged so that the planar surface is orthogonal to the axis L1, for example.

In the embodiment described above, the arrangement and shape of the first to third terminal holders 41 to 43 and the structure holding each of the terminals 40a, 40b may be changed in accordance with the specification. For instance, each of the first to third terminal holders 41 to 43 may be arranged on the cover 24.

In the embodiment described above, the control IC 72 of the connector unit 4 is inserted into the socket 68 but not particularly limited in such a manner. The structure of a portion inserted into the socket 68 in the connector unit 4 may be changed in accordance with the specification. Further, the connector unit does not have to include the control IC 72 and may include a connection terminal connected to the terminal 40a, 40b.

In the embodiment described above, the torsion spring 28 is used as a bias member for pushing the power supply brush 26. Other springs may be used instead.

In the embodiment described above, the deceleration mechanism 62 includes the worm shaft 82 and the worm wheel 84 but is not particularly limited in such a manner and may include a flat gear or the like.

In the embodiment described above, the present invention is applied to the motor 1 used in the drive source of the power window device but is not particularly limited in such a manner and may be applied to a motor used as a drive source for a device other than the power window device.

In the embodiment described above, each terminal (terminals 40a and 40b) arranged in the brush holder 21 has the shape of a tuning fork, and the terminal (connection terminal 72a) arranged in the connector unit 4 is inserted into the turning fork shaped terminal. Instead, the terminal arranged in the connector unit 4 may have the shape of a tuning fork, and the terminal arranged in the brush holder 21 may be the inserting terminal.

Figure 8:
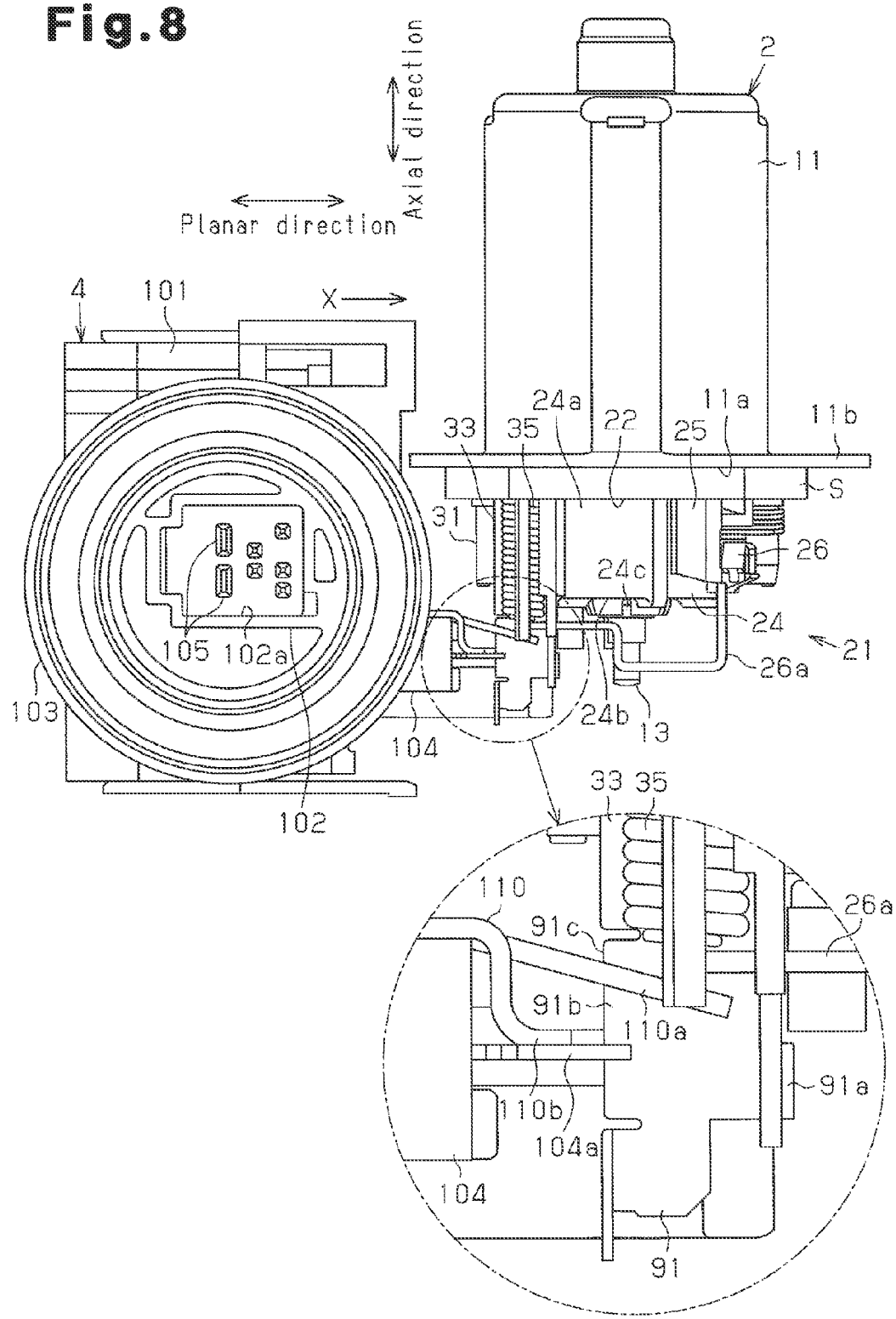
FIG. 8 is a side view showing a modification of the motor unit and the connector unit.
Figure 9:
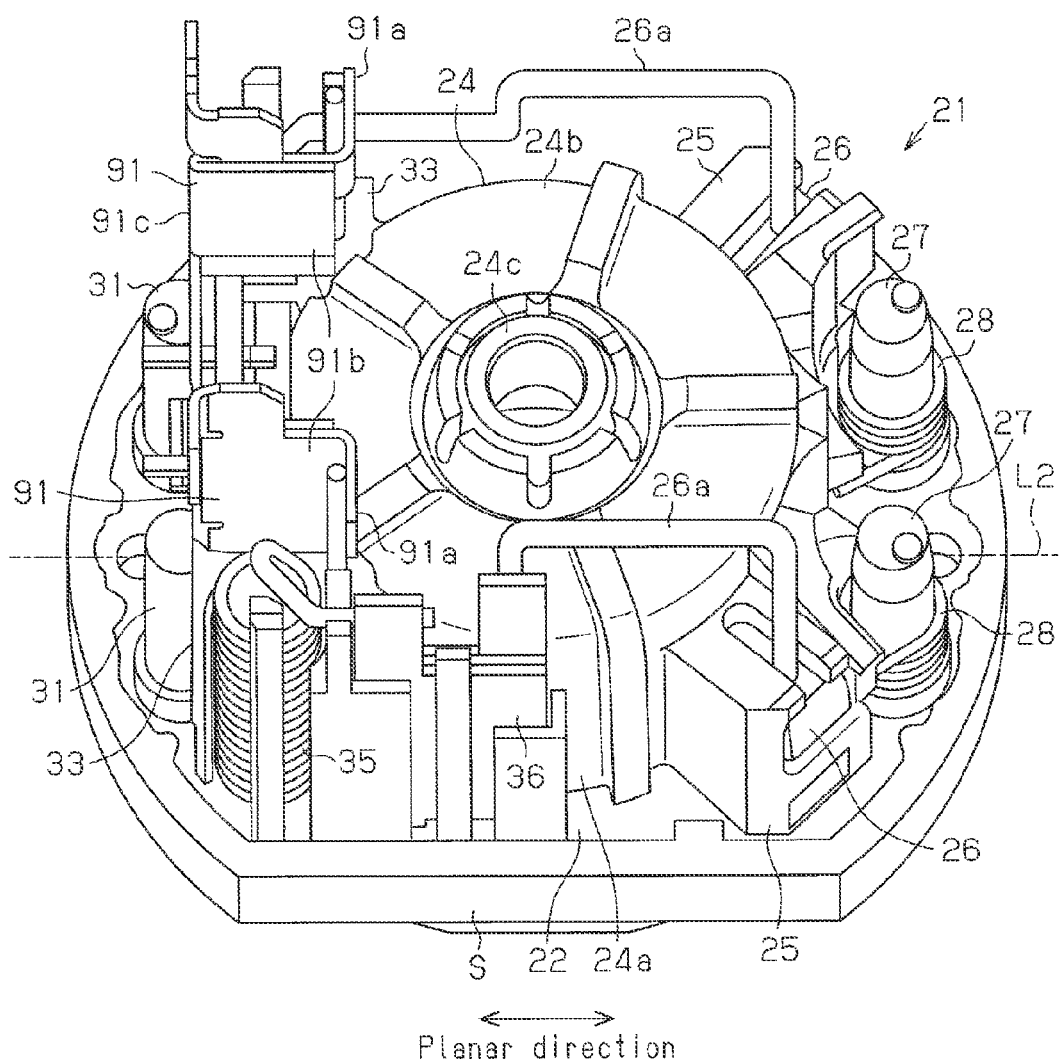
FIG. 9 is a perspective view showing a modification of the brush holder.

In a structure shown in FIGS. 8 and 9, two terminals 91 serving as conductive members are held at the two holding wall portions 33 of the brush holder 21, respectively. Each terminal 91 sandwiches opposite sides of the yoke 11 in the axial direction with the commutator 16 (cover 24) and is configured to be line symmetric with respect to the planar line L2.

Each of the two terminals 91 is formed from a single metal plate and includes a connecting piece 91a, which is connected to a terminal extending from the choke coil 35, and an inserting portion 91b, which is connected to a connector side terminal 110. The inserting portion 91b of each terminal 91, which has a planar shape and extends parallel to the axial direction of the motor, is formed by bending part of the metal plate material so as to be overlapped in the thickness direction of the motor. A bent end 91c formed by bending the metal plate material at the inserting portion 91b faces the connector side terminal 110. When manufacturing the brush holder 21, the two terminals 91 are integrally formed and connected between the two holding wall portions 33. The connecting part is cut after being fixed to the holding wall portion 33 to insulate the two terminals 91.

As shown in FIG. 8, the connector unit 4 includes a connector housing 100 coupled to the gear housing 61. An external connecting portion 102 extends in the thickness direction at one side surface of the connector housing 101. An insertion hole 102a extending to the interior of the connector housing 101 is arranged in the central part of the external connecting portion 102. The insertion hole 102a is recessed in the thickness direction. The inner peripheral surface of the insertion hole 102a has a shape corresponding to the outer shape of the external connector (not shown) received by the insertion hole 102a. The external connecting portion 102 is surrounded by a substantially cylindrical connector boot 103. The connector boot 103 prevents water from entering the insertion hole 102a. The connector boot 103 of the present embodiment is formed from an elastomer and is integrally molded with the connector housing 101. The connector housing 101 is coupled to the gear housing 61 along the coupling direction X in the planar direction of the motor.

The connector housing 101 accommodates a box-shaped control circuit substrate 104. The control circuit substrate 104 is formed by covering a circuit substrate, on which a plurality of electronic components are mounted, with an insulating resin material. The thickness direction of the substrate 104 is parallel to the axial direction of the motor. The control circuit substrate 104 is arranged so that one end in the longitudinal direction (one end in planar direction of motor) projects from the connector housing 101 towards the brush holder 21. A substrate side terminal 104a extending in the planar direction of the motor is arranged at the projecting end of the control circuit substrate 104. The connector unit 4 includes a connector terminal 105 electrically connected to the control circuit substrate 104. One end of the connector terminal 105 extends into the insertion hole 53a of the external connecting portion 53 and is connected to the external connector that is inserted into the insertion hole 53a.

Two connector side terminals 110 (connection terminal) are held by the connector housing 101 at the upper axial side of the control circuit substrate 104. Each connector side terminal 110 has a first connecting piece 110a extended towards the brush holder 21 and connected to the terminal 91. The first connecting piece 110a is bifurcated (shaped like a tuning fork) when viewed in the axial direction, and the inserting portion 91b of the terminal 91 is inserted between the bifurcated part. The inserting portion 91b is elastically sandwiched by the first connecting piece 110a in the thickness direction of the motor (direction orthogonal to plane of drawing in FIG. 8). This electrically connects the connector side terminal 110 and the terminal 91. The first connecting piece 110a is inclined to the opposite side of the yoke in the axial direction. In other words, the first connecting piece 110a extends away from the yoke in the axial direction. Thus, the dimension of the first connecting piece 110a in the radial direction of the motor can be kept small while ensuring a proper length for the first connecting piece 110 that facilitates insertion of the terminal 91. Each connector side terminal 110 includes a second connecting piece 110b extending in the shape of a crank shape. The second connecting piece 110b is electrically connected to the substrate side terminal 104a of the control circuit substrate 104 by welding.

The connector unit 4 having such a structure is coupled to the gear housing 61 along the planar direction (coupling direction X) of the motor 1. The inserting portion 91b is inserted to the first connecting piece 110a by the assembly of the connector unit 4 in the coupling direction X. The first connecting piece 110a sandwiches the inserting portion 91b in the thickness direction of the motor with its elastic force to electrically connect each connector side terminal 110 and each terminal 91.

In the structure shown in FIGS. 8 and 9, each terminal 91 serving as the conductive member is arranged to sandwich the yoke 11 with the commutator (cover 24). This suppresses enlargement of the motor 1 in the radial direction.

The present examples and embodiments are to be considered as illustrative and not restrictive, and the invention is not to be limited to the details given herein, but may be modified within the scope and equivalence of the appended claims.

I claim:

1. A motor comprising:
   a motor unit that outputs rotational drive force, wherein the motor unit includes
      a yoke housing having an open end in an axial direction,
      a commutator,
      a power supply brush that supplies power to the commutator,
      a conductive member electrically connected to the power supply brush, and
      a brush holder arranged in the open end to hold the commutator, the power supply brush, and the conductive member; and
   a deceleration unit including,
      a gear housing coupled to the open end, and
      a deceleration mechanism arranged in the gear housing to decelerate and output the rotational drive force of the motor unit, wherein
   the commutator and the power supply brush are arranged outside the yoke housing,
   the conductive member and the yoke housing are arranged on opposite sides of the commutator,
   the brush holder includes a cover having an outer circumferential wall portion, which substantially covers an outer periphery of the commutator and a circular wall portion, which substantially covers an axial end face of the commutator,
   the power supply brush extends from outside the outer circumferential wall portion of the cover toward inside the outer circumferential wall so that a distal end of the power supply brush positions at the inside of the outer circumferential wall portion,
   the circular wall portion has a holder that holds the conductive member, and
   the conductive member is arranged so that at least part of the conductive member overlaps the commutator in the axial direction.

2. The motor according to claim 1, wherein the holder being configured so that the conductive member is coupled from an opposite side of the yoke housing to the holder in the axial direction.

3. The motor according to claim 2, wherein the holder is arranged so that at least part of the holder overlaps the commutator in the axial direction.

4. The motor according to claim 1, wherein
   the commutator includes a first end face facing the yoke housing and an opposite second end face, and
   the cover covers the second end face of the commutator.

5. The motor according to claim 1, further comprising a connector unit coupled to the gear housing and including a connection terminal electrically connected to the conductive member, wherein
   the conductive member includes a terminal portion having an elastic bifurcated section, and
   the connection terminal is inserted into the bifurcated section of the terminal portion and elastically sandwiched by the bifurcated section.

6. The motor according to claim 5, wherein
   the bifurcated section includes a basal end divided into two, and
   the holder holds the bifurcated section at a part closer to a distal end than the basal end.

7. The motor according to claim 1, further comprising a connector unit coupled to the gear housing and including a connection terminal electrically connected to the conductive member, wherein
   the connector unit is coupled to the gear housing along a predetermined coupling direction, and
   the conductive member includes a hook contactable with the brush holder in the coupling direction.

8. The motor according to claim 1, wherein the conductive member is planar and includes a planar surface parallel to an axis of the motor unit.

9. The motor according to claim 1, further comprising a connector unit coupled to the gear housing and including a connection terminal electrically connected to the conductive member, wherein
   the brush holder holds an electric component, which is electrically connected to the conductive member, and is arranged so that the brush holder and the yoke housing are located on opposite sides of the commutator; and
   the conductive member is substantially U-shaped and includes a first terminal portion and a second terminal portion, which extend in a direction orthogonal to an axis of the motor unit and face the same direction with respect to each other, and an intermediate portion, which connects the terminal portions, wherein the connection terminal of the connector unit is connected to the first terminal portion, and a conductive wire extends from the power supply brush to the second terminal portion.

10. The motor according to claim 9, wherein the first and second terminal portions of the conductive member are arranged parallel to the direction orthogonal to the axial direction of the motor unit.

11. The motor according to claim 1, further comprising a connector unit coupled to the gear housing and including a connection terminal electrically connected to the conductive member.

12. The motor according to claim 1, wherein the conductive member extends along a line that is orthogonal to an axis of a rotation shaft and lies along a planar direction of the motor.

13. The motor according to claim 1, wherein if the axis of the rotation shaft formed an imaginary line dividing two planes, the conductive member extend across the plane divided by the imaginary line.

14. A motor comprising:
   a motor unit that outputs rotational drive force, wherein the motor unit includes
      a yoke housing having an open end in an axial direction,
      a commutator,
      a power supply brush that supplies power to the commutator,
      a conductive member electrically connected to the power supply brush, and
      a brush holder arranged in the open end to hold the commutator, the power supply brush, and the conductive member; and
   a deceleration unit including, a gear housing coupled to the open end, and
a deceleration mechanism arranged in the gear housing to decelerate and output the rotational drive force of the motor unit, wherein the commutator and the power supply brush are arranged outside the yoke housing, the conductive member and the yoke housing are arranged on opposite sides of the commutator, the brush holder includes a cover having an outer circumferential wall portion, which substantially covers an outer periphery of the commutator and a circular wall portion, which substantially covers an axial end face of the commutator, the power supply brush extends from outside the outer circumferential wall portion of the cover toward inside the outer circumferential wall so that a distal end of the power supply brush positions at the inside of the outer circumferential wall portion, the circular wall portion has a holder that holds the conductive member, the holder is configured so that the conductive member is coupled from an opposite side of the yoke housing to the holder in the axial direction, and the holder is arranged so that at least part of the holder overlaps the commutator in the axial direction.

15. A motor comprising:
a motor unit that outputs rotational drive force, wherein the motor unit includes
a yoke housing having an open end in an axial direction,
a commutator,
a power supply brush that supplies power to the commutator,
a conductive member electrically connected to the power supply brush, and
a brush holder arranged in the open end to hold the commutator, the power supply brush, and the conductive member;
a deceleration unit including,
a gear housing coupled to the open end, and
a deceleration mechanism arranged in the gear housing to decelerate and output the rotational drive force of the motor unit; and
a connector unit coupled to the gear housing and including a connection terminal electrically connected to the conductive member, wherein the commutator and the power supply brush are arranged outside the yoke housing, the conductive member and the yoke housing are arranged on opposite sides of the commutator, the brush holder includes a cover having an outer circumferential wall portion, which substantially covers an outer periphery of the commutator and a circular wall portion, which substantially covers an axial end face of the commutator, the power supply brush extends from outside the outer circumferential wall portion of the cover toward inside the outer circumferential wall so that a distal end of the power supply brush positions at the inside of the outer circumferential wall portion, the circular wall portion has a holder that holds the conductive member, the connector unit is coupled to the gear housing along a predetermined coupling direction, and the conductive member includes a hook contactable with the brush holder in the coupling direction.

16. A motor comprising:
a motor unit that outputs rotational drive force, wherein the motor unit includes
a yoke housing having an open end in an axial direction,
a commutator,
a power supply brush that supplies power to the commutator,
a conductive member electrically connected to the power supply brush, and
a brush holder arranged in the open end to hold the commutator, the power supply brush, and the conductive member;
a deceleration unit including,
a gear housing coupled to the open end, and
a deceleration mechanism arranged in the gear housing to decelerate and output the rotational drive force of the motor unit; and
a connector unit coupled to the gear housing and including a connection terminal electrically connected to the conductive member, wherein the commutator and the power supply brush are arranged outside the yoke housing, the conductive member and the yoke housing are arranged on opposite sides of the commutator, the brush holder includes a cover having an outer circumferential wall portion, which substantially covers an outer periphery of the commutator and a circular wall portion, which substantially covers an axial end face of the commutator, the power supply brush extends from outside the outer circumferential wall portion of the cover toward inside the outer circumferential wall so that a distal end of the power supply brush positions at the inside of the outer circumferential wall portion, the circular wall portion has a holder that holds the conductive member, the brush holder holds an electric component, which is electrically connected to the conductive member, and is arranged so that the brush holder and the yoke housing are located on opposite sides of the commutator; and the conductive member is substantially U-shaped and includes a first terminal portion and a second terminal portion, which extend in a direction orthogonal to an axis of the motor unit and face the same direction with respect to each other, and an intermediate portion, which connects the terminal portions, wherein the connection terminal of the connector unit is connected to the first terminal portion, and a conductive wire extends from the power supply brush to the second terminal portion.

* * * * *